United States Patent
Berkey et al.

(10) Patent No.: US 6,597,848 B1
(45) Date of Patent: Jul. 22, 2003

(54) DISPERSION COMPENSATING FIBER

(75) Inventors: George E. Berkey, Pine City, NY (US); Lei Jiang, San Diego, CA (US); Dale R. Powers, Painted Post, NY (US); V. Srikant, Ithaca, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/558,649

(22) Filed: Apr. 26, 2000

Related U.S. Application Data

(60) Provisional application No. 60/131,879, filed on Apr. 30, 1999.

(51) Int. Cl.⁷ ............................................. G02B 6/18
(52) U.S. Cl. .................................................. 385/124
(58) Field of Search ................................. 385/123–128

(56) References Cited

U.S. PATENT DOCUMENTS

| | | | |
|---|---|---|---|
| 4,675,040 A | 6/1987 | Tanaka et al. | 65/3.12 |
| 4,812,155 A | 3/1989 | Kyoto et al. | 65/3.12 |
| 5,361,319 A | 11/1994 | Antos et al. | 385/123 |

(List continued on next page.)

FOREIGN PATENT DOCUMENTS

| | | | |
|---|---|---|---|
| EP | 0 721 119 A1 | 7/1996 | |
| EP | 0 851 247 A2 | 7/1998 | |
| WO | 97/33188 | 9/1997 | |
| WO | 99/08142 | 2/1999 | |
| WO | WO01/73486 | 10/2001 | G02B/6/00 |

OTHER PUBLICATIONS

Y. Yokoyama et al., "Practically Feasible Dispersion Flattened Fibers Produced By VAD Technique", ECOC '98, Sep. 20–24, 1998, Madrid Spain, pp. 131–132.

A.M. Vengsarkar et al., "Dispersion–compensating single–mode fibers: efficient designs for first– and second–order compensation", Optics Letters, vol. 18, No. 11, Jun. 1, 1993, pp. 924–926.

M. Onishi et al., "High NA Double–Cladding Dispersion Compensating Fiber for WDM Systems", ECOC '94, vol. 2, pp. 681–684 1994 (month unknown).

L. Gruner–Nielsen et al., "Design and Manufacture of Dispersion Compensating Fibre for Simultaneous Compensation of Dispersion and Dispersion Slope", Optical Fiber Communication Conference and the International Conference on Integrated Optics and Optical Fiber Communication Technical Digest, Feb. 24, 1999, pp. 232–234.

L. Jiang et al., "Design and Fabrication of Ultra–Broad Band Dispersion Compensating Fibers" (date unknown).

U.S. patent application Ser. No. 10/122,250, filed Apr. 11, 2002, Applicant–Corning Incorporated; and Preliminary Amendment relating thereto filed May 31, 2002, which adds claims 19–26.

*Primary Examiner*—Rodney Bovernick
*Assistant Examiner*—Mike Stahl
(74) *Attorney, Agent, or Firm*—Robert L. Carlson

(57) ABSTRACT

Disclosed is a dispersion compensating optical fiber that includes a core surrounded by a cladding layer of refractive index $n_{CL}$. The core includes at least three radially adjacent regions, a central core region, a moat region having a refractive index $n_M$ that is sufficiently lower than $n_{CL}$ such that $\Delta_M \leq -0.4\%$, and a ring region. As the ring region exhibits sufficiently high refractive index at a sufficiently long distance from the outer edge of the moat region, the fiber can exhibit low values of negative dispersion slope at low values of negative dispersion and yet exhibit good bending loss. This ring region is also capable of imparting to the fiber a relatively high cutoff wavelength, so that the present invention is particularly well suited for use in L-band systems. A particularly suitable fiber has an index profile in which that part of the ring region at the transition between the moat and the ring region has a refractive index such that its delta value is close to zero. Also disclosed is a method of forming the fiber of the present invention.

24 Claims, 8 Drawing Sheets

U.S. PATENT DOCUMENTS

| | | |
|---|---|---|
| 5,555,340 A | 9/1996 | Onishi et al. ............... 385/127 |
| 5,558,693 A | 9/1996 | Sarkar ......................... 65/382 |
| 5,568,583 A | 10/1996 | Akasaka et al. ............ 385/123 |
| 5,581,647 A | 12/1996 | Onishi et al. ............... 385/123 |
| 5,673,354 A | 9/1997 | Akasaka et al. ............ 385/127 |
| 5,703,978 A | 12/1997 | DiGiovanni et al. .......... 385/37 |
| 5,740,297 A | 4/1998 | Onishi et al. ............... 385/127 |
| 5,742,723 A | 4/1998 | Onishi et al. ............... 385/127 |
| 5,838,867 A | 11/1998 | Onishi et al. ............... 385/123 |
| 5,999,679 A * | 12/1999 | Antos et al. ................. 385/127 |
| 6,009,221 A | 12/1999 | Tsuda ......................... 385/123 |
| 6,349,163 B1 | 2/2002 | Antos et al. ................. 385/127 |
| 6,363,196 B1 * | 3/2002 | Rousseau .................... 385/127 |
| 6,430,347 B1 * | 8/2002 | Cain et al. .................. 385/123 |
| 6,445,864 B2 | 9/2002 | Jiang et al. ................. 385/127 |
| 6,453,102 B1 | 9/2002 | Dong et al. ................. 385/123 |

* cited by examiner

DISPERSION COMPENSATING FIBER

This application claims the benefit of provisional application 60/131,879 filed Apr. 30, 1999.

BACKGROUND OF THE INVENTION

1. Field of the Invention

The present invention relates to dispersion compensating optical fibers that are suitable for use in wavelength division multiplexing (WDM) systems, and to dispersion compensating fibers that are particularly well suited for use in L-band systems that operate at wavelengths longer than 1565 nm. It also relates to dispersion compensated links utilizing such dispersion compensating fibers, and to a process for making the dispersion compensating fibers.

2. Technical Background

Telecommunications systems presently in place include single-mode optical fibers which exhibit zero dispersion at a wavelength around 1300 nm; such fibers are referred to herein as "SMF fibers". Signals transmitted within such systems at wavelengths around 1300 nm remain relatively undistorted. Signals can be transmitted over such systems at wavelengths around 1550 nm in order to achieve lower loss and to utilize the effective and reliable erbium fiber amplifiers that operate in the 1550 nm window.

Over the past few years telecommunications systems have been upgraded from 2.5 Gbs single channel systems to 10 Gbs WDM systems. The increased bit rate per channel has made these systems dispersion limited. Transmission at 1550 nm over SMF fibers introduces a dispersion of about +17 ps/nm·km; such fibers are therefore restricted to about 60 kms uninterrupted transmission at 10 Gbs. The solution put forth to counter this has been to dispersion compensate at regular intervals. For example, a single-mode fiber with a dispersion of +17 ps/nm·km at 1550 nm requires a dispersion compensation of 1020 ps/nm every 60 km. Therefore, a dispersion compensating (DC) module containing a DC fiber has to be inserted into the system at every amplifier stage that accounts for about 1000 ps/nm accumulated dispersion. As this length of DC fiber does not account for any real transmission distance, it is desirable to keep this length as short as possible. This implies that the negative dispersion of the DC fiber must be maximized. However, as the dispersion is made more negative via increasing the role played by waveguide dispersion, the fiber becomes more bend sensitive and the base attenuation of the fiber increases. Therefore, most value is gained by maximizing dispersion (D) while simultaneously keeping attenuation (Attn) as low as possible. Thus, the ratio of |D/Attn|, known as the figure of merit, must be maximized rather than dispersion alone.

Until recently, system and DC fiber designers had considered only one channel (1550 nm). That is, a DC fiber would be used to compensate dispersion at only one wavelength, and hence the dispersion slope of the fiber was not important. However, with the new emphasis on WDM technology, it has become necessary to provide dispersion compensation over all wavelengths of transmission within the erbium fiber amplifier window. This implies that designers are now restricted by the channel that has the worst compensation. An obvious solution to the above quandary is to design a DC fiber such that dispersion is simultaneously compensated at all wavelengths. Thus, there is an added criterion to satisfy, namely, dispersion slope. The figure of merit must be maintained at a large value for all wavelengths at which the DC fiber is to be utilized. As the bend-edge causes increased attenuation at longer wavelengths, DC fibers that have a low bend edge have been limited to use at C-band wavelengths (up to 1565 nm) that are substantially unaffected by this effect.

To examine the effect of dispersion slope on the system assume that a system employs the aforementioned SMF fiber, which has a dispersion of +17 ps/nm/km and dispersion slope of about +0.056 ps/nm$^2$·km at 1550 nm. Consider the effect of five different DC fibers on the system. The dispersion and dispersion slope characteristics of the five fibers are shown in Table 1, wherein dispersion, D is expressed in units of ps/nm·km, and dispersion slope, Dslope is expressed in units of ps/nm$^2$·km.

TABLE 1

| DC Fiber | D | D Slope | Uncompensated Dispersion @ 1530/ 1000 km | Uncompensated Dispersion @ 1565/ 1000 km | Distance (km) @ 10 Gbs | Distance (km) @ 40 Gbs |
|---|---|---|---|---|---|---|
| 1 | −85 | −0.186 | −400 | 300 | ~1200 | ~75 |
| 2 | −102 | −0.186 | −540 | 405 | ~880 | ~55 |
| 3 | −85 | −0.28 | 0 | 0 | >10000 | >1000 |
| 4 | −102 | −0.28 | −200 | 150 | ~2400 | ~150 |
| 5 | −85 | | −1200 | 900 | ~400 | ~25 |

DC fibers having dispersions of −85 and −102 ps/nm·km have been chosen for this theoretical example since a length L of DC fiber having a dispersion of −85 ps/nm·km will compensate for a length 5L of SMF fiber having a dispersion of 17 ps/nm·km, and a length L of DC fiber having a dispersion of −102 ps/nm km will compensate for a length 6L of that SMF fiber.

Using the characteristics of the SMF fiber and the DC fiber, the uncompensated dispersion at the end channels (1530 nm and 1565 nm) of the erbium C band window can be calculated, assuming that all DC fibers are designed for complete compensation at 1550 nm. Calculated values are given in columns 4 and 5 of Table 1. If it is assumed that the system is pulse spectral width limited, then the relationship between dispersion, bit rate and total length is given by equation 1, $$B(|\beta_2|L)^{1/2} < \frac{1}{4} \tag{1}$$

where B is the bit rate, $\beta_2 = (D\lambda^2)/2\pi c$, and L is the length.

Equation 1 can be rewritten in terms of bit rate and the total dispersion accumulated in a given length. Based on the above relationship, given a bit rate and the average accumulated dispersion, one can determine the total length of a system before dispersion becomes a limiting factor, and this length is given for bit rates of 10 and 40 Gbs in columns 6 and 7 of Table 1. DC fibers 1, 2, 3 and 4 are theoretical examples which are used herein to demonstrate the effects of various dispersions and dispersion slopes on system length.

DC fiber 5 is a commercial fiber that compensates for dispersion at only one wavelength, eg. 1550 nm. Dispersion slope is not listed for DC fiber 5 since dispersion slope was not specified for DC fibers intended for operation at a single wavelength, and dispersion slope could vary between approximately −0.5 and +0.5 ps/nm²·km without adversely affecting system operation. It is noted that DC fibers 1, 2, 3 and 4 are suitable for use in a 10 Gbs system in that their use in such a system enables signal transmission over a distance of at least 600 km. Of the five listed fibers only DC fiber 3 is suitable for use in a 40 Gbs system.

The κ value of a DC fiber is defined herein as $$\kappa = (D_{DC})/(DSlope_{DC}) \qquad (2)$$

where $D_{DC}$ and $Dslope_{DC}$ are the dispersion and dispersion slope of the DC fiber. Relative dispersion slope (RDS), the reciprocal of κ, is sometimes used to characterize a ratio of dispersion and dispersion slope. The ratio of the dispersion to dispersion slope of the SMF fiber is about 303. DC Fiber 3 is unique, since the dispersion and the dispersion slope of that DC fiber are such that essentially complete compensation can be achieved over all wavelengths. In other words, the κ value of DC fiber 3 is also 303. This criterion is defined as full compensation. Line 20 of FIG. 2 is referred to as the line of full compensation, as its slope is 303. DC fiber 3 is represented by that point on line 20 where dispersion is −85 ps/nm·km and dispersion slope is −0.28 ps/nm²·km. Other fibers falling on line 20, such as one having a dispersion of −102 ps/nm·km and a dispersion slope of −0.336 ps/nm²·km, for example, would also afford full compensation.

Although DC fiber 3 is superior to DC fibers 1, 2 and 4 for a 10 Gbs system, it does not add value, as terrestrial systems are designed primarily for a maximum distance of about 600 km. Thus, certain DC fibers which do not provide complete compensation are suitable for use in DC modules, and, if these DC fibers are more easily produced than those that do provide complete compensation, they would be preferred. DC fibers 1, 2 and 4 have κ values of 457, 548 and 380, respectively. Values of κ that are lower than those of DC fibers 1, 2 and 4 and which are closer in value to 303 correspond to enhanced dispersion properties and thus to longer transmission distances. DC fibers 4 and 1 are arbitrarily selected for presentation in FIG. 2 where they are represented by lines 21 and 22, respectively. Shaded region 23 between lines 21 and 22 represents one group of DC fibers that provide acceptable dispersion and dispersion slope, and moreover, they can be employed in 10 Gbs WDM systems longer than 1000 km. DC fibers having dispersion properties between lines 20 and 21 and even those having properties falling below line 20 and near thereto would be suitable for use in DC modules, but it is not necessary to use fibers having such low κ values in 10 Gbs systems.

Only those DC fibers that have dispersion properties on or very near line 20 would be suitable for use in 40 Gbs systems.

Erbium fiber amplifiers that are presently being developed will operate in the L-band, which includes wavelengths longer than the current limit of 1565 nm. Presently available DC fibers, which provide acceptable dispersion properties, are not suitable for use at such longer wavelengths as their bend-edge wavelength is sufficiently low that loss is unacceptable at wavelengths longer than 1565 nm. The bend-edge is moved to shorter wavelengths as the cutoff wavelength ($\lambda_{CO}$) decreases and as the mode field diameter (MFD) increases. In either case the light is very weakly guided. Therefore, in order to push the bend-edge to higher wavelengths, $\lambda_{CO}$ must be increased, and/or MFD must be decreased.

If the MFD is too small, non linear effects such as cross phase modulation and self phase modulation increase and splice loss increases. Therefore, MFD should be greater than 4 μm and preferably greater than 4.5 μm.

In order to provide desired low values of negative dispersion and negative dispersion slope, prior DC fiber designs have resulted in cutoff wavelengths below about 1000 nm, some being below 800 nm. For bend-edge wavelength to exceed 1565 nm in a DC fiber exhibiting desirable dispersion properties, cutoff wavelength should be higher than 1000 nm, and is preferably higher than 1300 nm. With present DC fiber designs, it is very difficult to have a cutoff wavelength longer than 1000 nm in fibers exhibiting a dispersion slope more negative than −0.2 ps/nm²·km. Cutoff wavelength should be sufficiently shorter than the lowest operating wavelength, preferably about 40 nm–50 nm shorter, to avoid an increase in attenuation. For a system operating in the erbium amplifier band, $\lambda_{CO}$ should be shorter than about 1500 nm.

Prior Dispersion Compensating Fiber Designs

As the large positive dispersion accumulated by transmission at 1550 nm over 1300 nm zero D fibers has been unacceptable for long distance signal transmission, dispersion compensating optical fibers have been employed in such 1550 nm systems. These dispersion compensation fibers exhibit large negative dispersion and may also exhibit negative dispersion slope. FIGS. 1A and 1B show index profiles of two types of previously employed DC fibers that provide suitable values of dispersion (D≦−80 ps/nm·km) and dispersion slope (DSlope≦−0.15 ps/nm²·km) and exhibit a bend-edge wavelength suitable for C-band systems that operate at wavelengths up to 1565 nm. More negative values of dispersion and dispersion slope can be achieved in such fibers; however, other characteristics such as bending loss are adversely affected.

The W-type three-layer index profile of FIG. 1A includes a central core 1, a second core layer or moat 2 and cladding 3. Fibers of the type represented by FIG. 1A are disclosed in U.S. Pat. No. 5,361,319. The diameters of core 1 and moat 2 are a and b, respectively. The normalized refractive indices of core 1 and moat 2 with respect to cladding 3 are Δ+ and Δ−, respectively. The Δ of a core layer having a refractive index $n_x$ is given by $(n_x^2-n_{CL}^2)/2n_x^2$, where $n_{CL}$ is the refractive index of the cladding. The ratio a/b as well as the previously mentioned core characteristics can be optimized to achieve large negative values of dispersion accompanied by negative disperson slope. It has been recognized that designs that optimize negative dispersion and negative dispersion slope can suffer from bending loss, light propagation problems and the like. The cutoff wavelengths of these W-type fibers are below 1000 nm, and bend-edge wavelengths are lower than 1700 nm.

FIG. 1B shows the index profile of another type of DC fiber that includes an additional core feature, viz. a positive delta ring immediately adjacent the moat, for modifying light propagation charactistics. Fibers that include a ring adjacent the moat region of the core are also disclosed in U.S. Pat. No. 5,361,319.

The fiber of FIG. 1B includes a central core 11 that is surrounded by moat region 12 which is in turn surrounded by ring 13. The normalized refractive indices of central core 11, moat 12 and ring 13 with respect to cladding 3 are $\Delta_C$, $\Delta_M$ and $\Delta_R$, respectively, where $\Delta_C$ equals $(n_C^2-n_{CL}^2)/2n_C^2$, $\Delta_M$ equals $-(n_M^2-n_{CL}^2)/2n_M^2$ and $\Delta_R$ equals $(n_R^2-n_{CL}^2)/2n_R^2$, where $n_C$, $n_R$, and $n_{CL}$ are the peak refractive indices of the central core region, ring, and cladding, respectively, and $n_M$ is the minimum refractive index of the moat. The outer radii of the central core 11, moat 12 and ring 13 are $r_C$, $r_M$ and $r_R$, respectively.

Curve 24 of FIG. 2 is a plot of dispersion vs. dispersion slope for a particular type FIG. 1B fiber profile. The fiber characteristics for a negative dispersion of −80 ps/nm·km were: $\Delta_C$=−1.9%, $\Delta_M$=−0.52%, $\Delta_R$=0.25%, $r_C$=1.65 μm, $r_M$=3.6 μm, and $r_R$=3.95 μm. Each data point in the graph represents the optical properties for a given core radius of the profile of FIG. 1B. Fibers having different outside diameters, and thus different core radii, were drawn, and the refractive index profiles were measured and were input to a computer model that generated the fiber dispersion characteristics. Different core diameters are obtained for a given profile by initially forming a plurality of identical DC fiber core preforms; each preform is provided with a different overclad thickness. When the resultant draw blanks are drawn to predetermined outside diameters, the core radii are different. The data point at the far right of the curve (where dispersion is about—42 ps/nm·km) represents the largest diameter; core diameter decreases at data points located to the left where dispersion is more negative. It has been preferred to employ curve 24-type fibers having dispersions around −85 ps/nm·km as they are less bend sensitive than those exhibiting more negative dispersions.

As previously indicated, 600 km 10 Gbs C-band systems do not need a full compensation solution (represented by line 20 of FIG. 2). The adequate solution falling within shaded area 23 of FIG. 2 meets the requirements of a 10 Gbs system while providing some margin of error. Some presently available DC fibers meet these requirements. Moreover, some presently available DC fibers have characteristics that fall on or near line 20 of FIG. 2 whereby they would be suitable for use in 40 Gbs C-band systems operating at wavelengths less than 1560 nm.

Sensitivity analysis and optical space mapping were performed on the present day DC profile shown in FIG. 1B to provide desired dispersion properties while improving other fiber characteristics. Only the essential results of that analysis are given. As the κ values of these analyzed profiles were greater than 303, a decrease in K represents an improvement in dispersion characeristics.

The DC fiber of the present invention provides the necessary negative dispersion and negative dispersion slope required for compensating dispersion in WDM systems operating at 10 or more Gbs, and preferably with the capability of operating in the L-band.

SUMMARY OF THE INVENTION

One aspect of the invention is a dispersion compensating optical fiber the profile of which is such that cutoff wavelength is sufficiently long to enable the use of the fiber in the L-band while maintaining desirable values of dispersion and dispersion slope. Another aspect is a dispersion compensating optical fiber having negative dispersion and dispersion slope properties suitable for use in SMF based WDM systems operating at bit rates of at least 10 Gbs. Yet another aspect is a dispersion compensating optical fiber that exhibits large values of both negative dispersion and negative dispersion slope and yet is not hampered by bend sensitivity. Another aspect of the invention is an optical transmission system including at least 40 km of single-mode optical fiber optimized for low dispersion operation at 1290–1330 nm in series with a much shorter length of dispersion compensating optical fiber having negative dispersion and dispersion slope properties suitable for use in WDM systems operating at bit rates of at least 10 Gbs at wavelengths greater than 1520 nm, and preferably at wavelengths greater than 1570 nm. A further aspect is a method of making a dispersion compensating optical fiber such that a region containing a readily diffusing dopant can be situated in close proximity to an undoped region.

One embodiment of the invention relates to a dispersion compensating optical fiber core of transparent material surrounded by a cladding layer of transparent material of refractive index $n_{CL}$. The core includes a central core region having a maximum refractive index $n_C$ such that $\Delta_C$ is greater than +1.2% surrounded by a moat region having a minimum refractive index $n_M$ such that $\Delta_M \leq -0.4\%$, which is surrounded by a ring region that includes a segment where refractive index increases with increasing radius to a refractive index of at least $n_R$ such that $\Delta_R \leq +0.15\%$. The segment is located at a radius that is at least 0.3 μm beyond the moat region. The refractive index profile of the fiber is such that the dispersion slope of the fiber is more negative than −0.15 ps/nm²·km at a wavelength of about 1550 nm. The dispersion slope of the fiber is preferably more negative than −0.2 ps/nm²·km at a wavelength of about 1550 nm, while the dispersion at that wavelength is preferably more negative than −80 ps/nm·km.

The ring region can include inner and outer portions having maximum refractive indices $n_{R1}$ and $n_{R2}$, respectively, that are greater than $n_{CL}$. The inner and outer ring portions can be separated by an inter-ring region having a refractive index $n_S$ that is less than $n_{R1}$ and $n_{R2}$, or the inner ring portion can be situated immediately adjacent the outer ring portion. The index profile can be such that $\Delta_{R1}$ can be equal to zero, less than zero or greater than zero.

The outer portion of the ring region can include a peak having a maximum refractive index $n_2$ such that $\Delta_{R2} \geq +0.15\%$. The maximum refractive index of the peak can be located between 0.3 μm and 3 μm from the outer edge of moat region, and is preferably located between 1 μm and 2.5 μm from the outer edge of moat region.

The cladding layer of the fiber can consist of silica doped with a refractive index increasing dopant, and the moat region can be formed of silica doped with a refractive index decreasing dopant such as, but not limited to, fluorine.

In accordance with a further embodiment, a dispersion compensating optical fiber includes a core of transparent material surrounded by a cladding layer of transparent material having a refractive index $n_{CL}$. The core includes three adjacent regions named in order of increasing radius: (a) a central core region having a maximum refractive index $n_C$, (b) a moat having a minimum refractive index $n_M$, and (c) a ring region including distinctive inner and outer portions having maximum refractive indices $n_{R1}$ and $n_{R2}$, wherein $n_C > n_{R1} > n_{CL} > n_M$ and $n_C > n_{R2} > n_{CL} > n_M$. The radial refractive index plot of the fiber is characterized in that the area under the outer half of the ring region is greater than the area under the inner half of the ring region. The central core region of the fiber preferably has a maximum refractive index $n_C$ such that $\Delta_C$ is greater than +1.2%, and the moat region preferably has a minimum refractive index $n_M$ such that $\Delta_M \leq -0.4\%$.

Yet another embodiment of the invention relates to a dispersion compensating optical fiber including a core of transparent material surrounded by a cladding layer of transparent material having a refractive index $n_{CL}$. The core has a central core region having a maximum refractive index $n_C$ such that $\Delta_C$ is greater than +1.2% surrounded by a moat region having a minimum refractive index $n_M$ such that $\Delta_M \leq -0.4\%$. The moat region is surrounded by a ring region including distinctive inner and outer portions having maximum refractive indices $n_{R1}$ and $n_{R2}$, respectively, that are greater than $n_{CL}$, whereby $\Delta_{R1}$ and $\Delta_{R2}$ are positive. The refractive index profile of the fiber is such that the cutoff wavelength is greater than 1000 nm and the dispersion slope is more negative than −0.2 ps/nm$_2$·km at a wavelength of about 1550 nm.

Another embodiment concerns a dispersion compensated optical transmission link including the serial combination of at least 40 km of standard single-mode transmission fiber optimized for low dispersion operation at a wavelength in the range between 1290 and 1330 nm, and a dispersion compensating optical fiber that includes a core of transparent material surrounded by a cladding layer of transparent material having a refractive index $n_{CL}$. The core includes a central core region having a maximum refractive index $n_C$ such that $\Delta_C$ is greater than +1.2%, surrounded by a moat region having a minimum refractive index $n_M$ such that $\Delta_M \leq -0.4\%$. The moat region is surrounded by a ring region that includes a segment where refractive index increases with increasing radius to a refractive index of at least $n_R$ such that $\Delta_R \geq +0.15\%$. The segment is located at a radius that is at least 0.3 μm beyond the moat region. The refractive index profile of the fiber is such that the dispersion slope of the fiber is more negative than −0.15 ps/nm$^2$·km at a wavelength of about 1550 nm, whereby the system is capable of operating at bit rates of at least 10 Gbs at wavelengths greater than 1520 nm.

The invention also concerns a method of forming an optical device. A first coating of base glass particles is deposited on a mandrel, and a second coating of glass particles is deposited on the outer surface of the first coating, the second coating being formed of the base glass and at least one dopant. The mandrel is removed from the resultant porous glass preform to form a longitudinal aperture through the preform. The porous preform is dried and sintered to form a solid glass tube having an inner region that is substantially free of the at least one dopant. The step of depositing the first coating includes depositing a first layer of the base glass particles on the mandrel at a first density, depositing a transition layer of the base glass particles on the first layer such that the density of the transition layer varies from the first density at the first layer to a second density at the outer surface of the transition layer, the second density being at least 30 percent less than the first density, and depositing a third layer of the base glass particles on the transition layer at the second density.

The step of depositing a first coating can include feeding at a first rate a first reactant to a burner to generate in the flame a stream of the base glass particles. The stream is directed onto the mandrel to deposit the first layer. The flow rate of the first reactant is gradually increased from the first flow rate to a second flow rate to form the transition layer. The first reactant is fed to the burner at the second rate to form the third layer. The first flow rate is preferably less than 70% of the second flow rate. Moreover, the flame is preferably hotter during the deposition of the first layer than it is during the deposition of the second layer.

In an embodiment wherein the base glass is $SiO_2$ and the dopant is $GeO_2$, and wherein the first reactant is $SiCl_4$, the flow rate of the $SiCl_4$ during the formation of the first layer is preferably less than 70% of the flow rate of $SiCl_4$ during the formation of the third layer. Moreover, the tendency for $GeO_2$ to diffuse and deposit in the inner region of the glass tube is reduced by flowing at least 75 sccm chlorine into the longitudinal aperture during the sintering step.

Yet another aspect of the present invention relates to a method of forming a fluorine containing glass article. The method includes the steps of forming a porous, fluorine containing glass preform, and heating the formed preform to a first temperature to sinter the preform. The sintered preform is then exposed to a temperature of at least 1000° C. and lower than the first temperature.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENTS

The family of refractive index profiles within the scope of this invention provides excellent negative dispersion and negative dispersion slope and improves other fiber characteristics such as bend sensitivity. DC fibers in accordance with the invention exhibit a "ring region" that includes an index-increasing segment where refractive index increases with increasing radius to a refractive index of at least $n_R$ such that $\Delta_R$+0.15%, the index-increasing segment of the ring being located at a radius that is at least 0.3 μm beyond the moat region.

For purposes of this discussion, the outer edge of the moat can be defined as follows. For a FIG. 4 type profile where the slope of the outer edge of the moat experiences little change before the curve reaches zero delta, the point on the curve at zero delta is the outer moat edge. For a FIG. 5B type profile where the slope of the outer edge of the moat experiences an abrupt change before the curve reaches zero delta, the point on the curve at which the abrupt change occurs is the outer moat edge.

The ring region of DC fibers in accordance with the invention generally has distinctive inner and outer portions the characteristics of which will become evident from a consideration of the following embodiments. By "distinctive" is meant that the ring region is not a single essentially symmetrical region of the refractive index profile as is ring 13 of FIG. 1B, wherein maximum refractive index occurs at or near the center of the ring. Rather, the inner and outer regions of the ring region are distinctive in that they include two separate spaced or unspaced rings or portions that are of the same or different refractive index.

Figure 3:
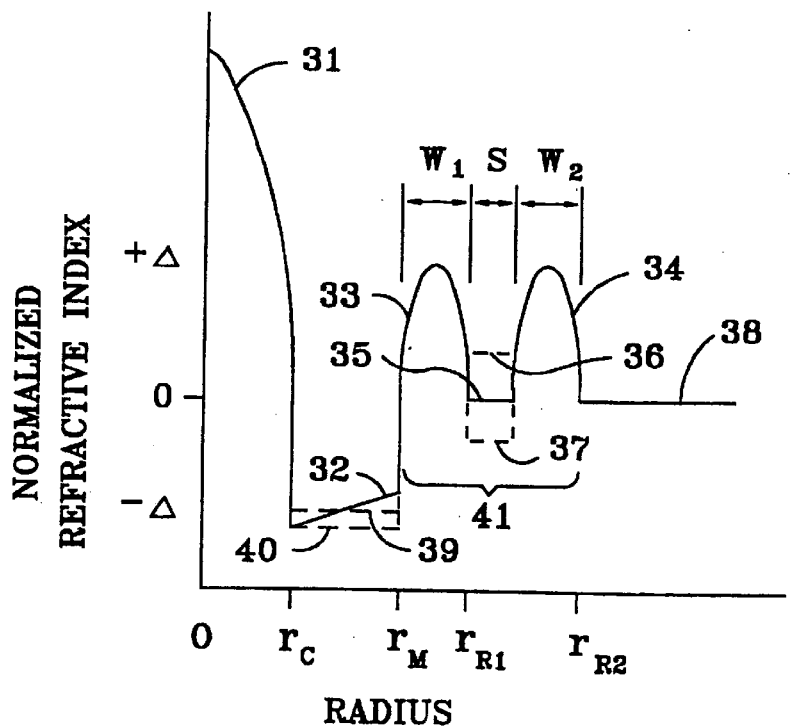
FIG. 3 is an idealistic refractive index profile of one aspect of the dispersion compensating fiber of this invention.
Figure 4:
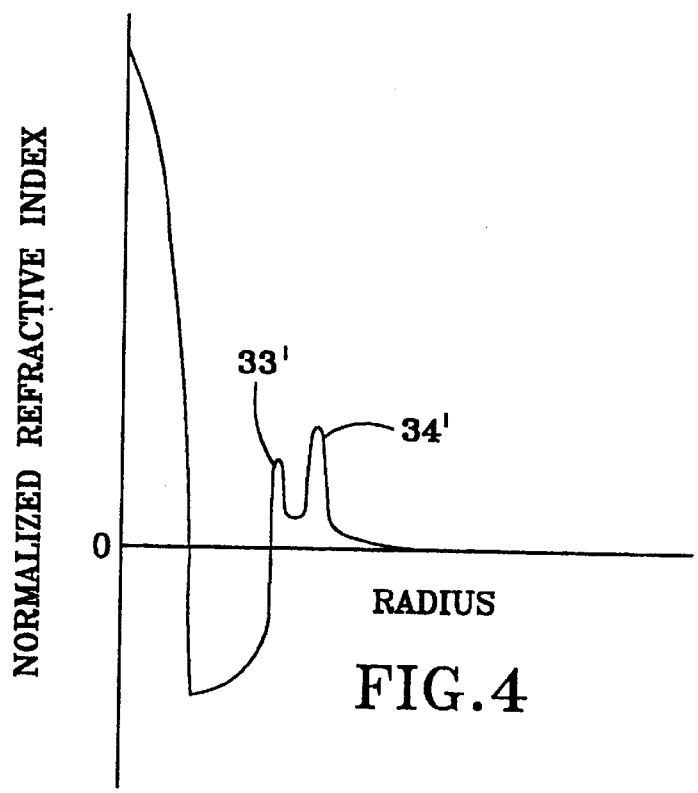
FIG. 4 is a refractive index profile of one embodiment of the dispersion compensating fiber of the present invention.
Figure 5A:
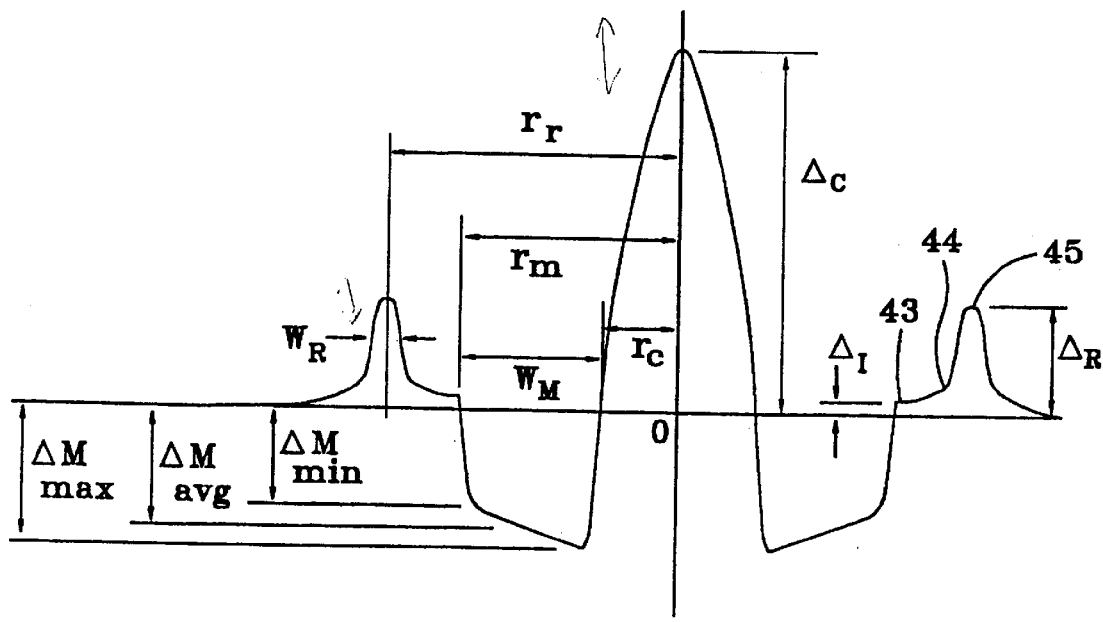
FIGS. 5A, 5B and 5C are refractive index profiles of further embodiments of the present invention.
Figure 5B:
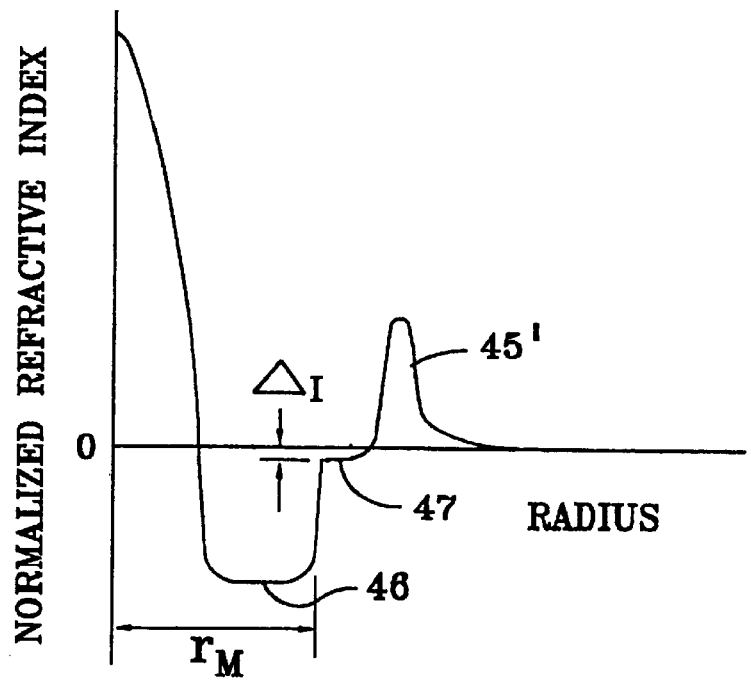
Figure 5C:
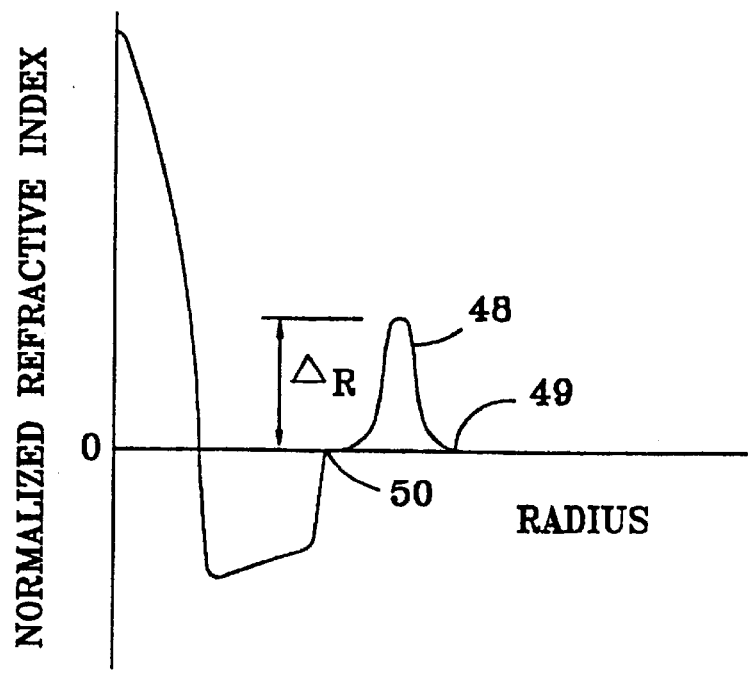

Various embodiments of the ring region are described in conjunction with FIGS. 3, 4, 5, 5A, 5B, 5C and 6. In most embodiments, the maximum refractive index of the ring region occurs at a radius of the ring region other than at the radial center thereof. In preferred embodiments, the radial refractive index plot of the fiber is characterized in that the area under the outer half of the ring region is greater than the area under the inner half thereof. FIG. 5C is an exception in that the ring region of that fiber is a single symmetrical refractive index peak the maximum refractive index of which occurs at the center of the ring region.

A salient feature of the invention is the ring region thereof which enables the fiber to exhibit large negative dispersion and suitable negative dispersion slope without incurring undue bend sensitivity, i.e. the bend-edge is moved to longer wavelengths. By suitable negative dispersion slope is meant a slope that is sufficiently negative to meet the requirements of a specific system. A narrow band system operating at wavelengths less than 1565 nm may require only a small negative dispersion slope, eg. about $-0.15$ ps/nm$_2$·km and a dispersion D$\leq-80$ ps/nm·km. WDM systems might require a dispersion slope Dslope $\leq-0.2$ or even 0.3 ps/nm$^2$·km at the operative wavelength(s). Various core parameters can be optimized to achieve desired dispersion properties, and the adverse consequences that would have resulted in prior art fibers can be compensated or prevented by proper design of the ring region. For example, $\Delta_C$ can be reduced to 1.5% or less, and $\Delta_M$ can be reduced to values more negative than $-0.4\%$, and the cutoff wavelength can be maintained at a wavelength above about 1000 nm. The invention also encompasses those DC fibers having excellent dispersion properties and having cutoff wavelengths less than about 1000 nm, the bend-edge wavelength being sufficiently long to enable usage in C-band systems.

An index profile of one aspect of the DC fiber of this invention is shown in FIG. 3. The fiber profile includes a central core 31 that is surrounded by moat region 32 which is in turn surrounded by first and second rings 33 and 34 which include ring region 41. In preferred embodiments, central core 31 has a gradient refractive index profile whereby the refractive index thereof decreases in accordance with the equation $n(r)=n_C[1-(r/a)^\alpha]$, where $\alpha$ is a number between 1 and $\infty$, and is preferably between about 1.5 and 2. The normalized refractive indices of central core 31, moat 32, ring 33, ring 34 and inter-ring region 35, 36, 37 with respect to silica cladding 38 are $\Delta_C$, $\Delta_M$, $\Delta_{R1}$, $\Delta_{R2}$ and As, respectively, where $\Delta_{R1}$ equals $(n_{R1}^2-n_{CL}^2)/2n_{R1}^2$, $\Delta_{R2}$ equals $(n_{R2}^2-n_{CL}^2)/2n_{R2}^2$, and $\Delta_S$ equals $(n_S^2-n_{CL}^2)/2n_S^2$, where $n_{R1}$, $n_{R2}$ and $n_S$ are the peak refractive indices of the first ring region, second ring region, and inner ring spacing, respectively. Definitions of $\Delta_C$, $\Delta_M$, $n_C$, $n_M$ and $n_{CL}$ are set forth above. The radii of the central core 31, moat 32 and rings 33 and 34 are $r_C$, $r_M$, $r_{R1}$ and $r_{R2}$, respectively. The remaining delta values and refractive indices are set forth in the description of FIG. 1B. The moat region is located immediately adjacent central core 31 and first ring 33.

Figure 1A:
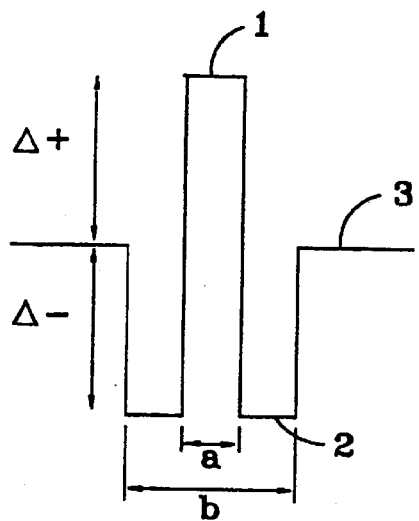
FIGS. 1A and 1B are refractive index profiles of two common types of prior art dispersion compensating optical fibers.
Figure 1B:
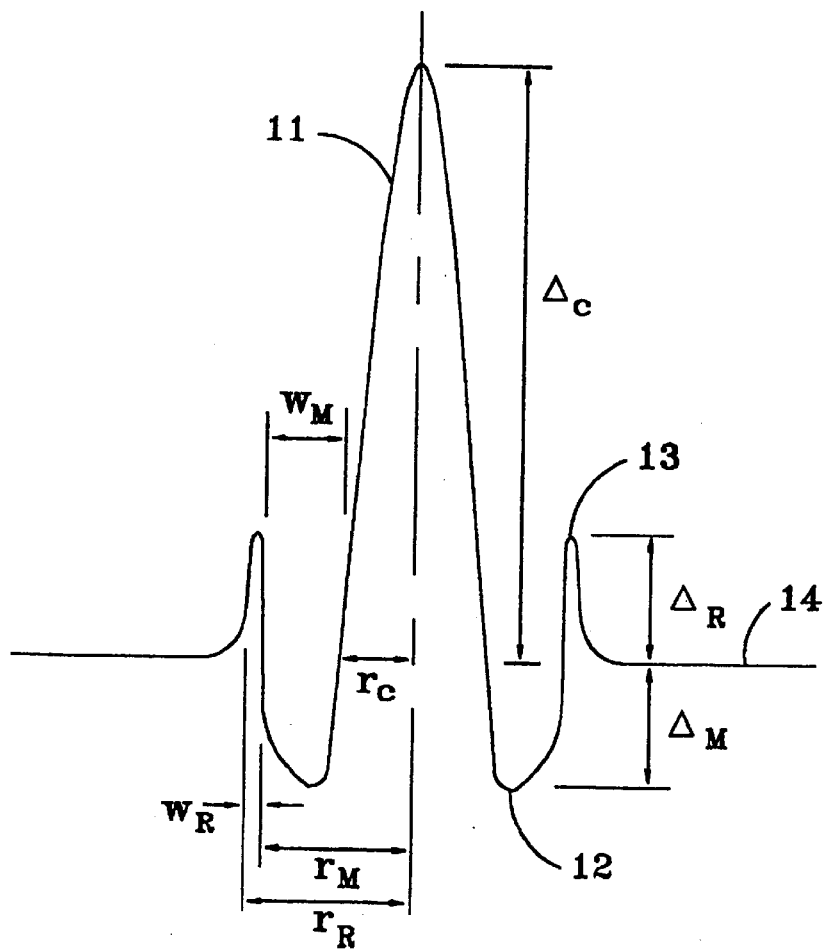
Figure 2:
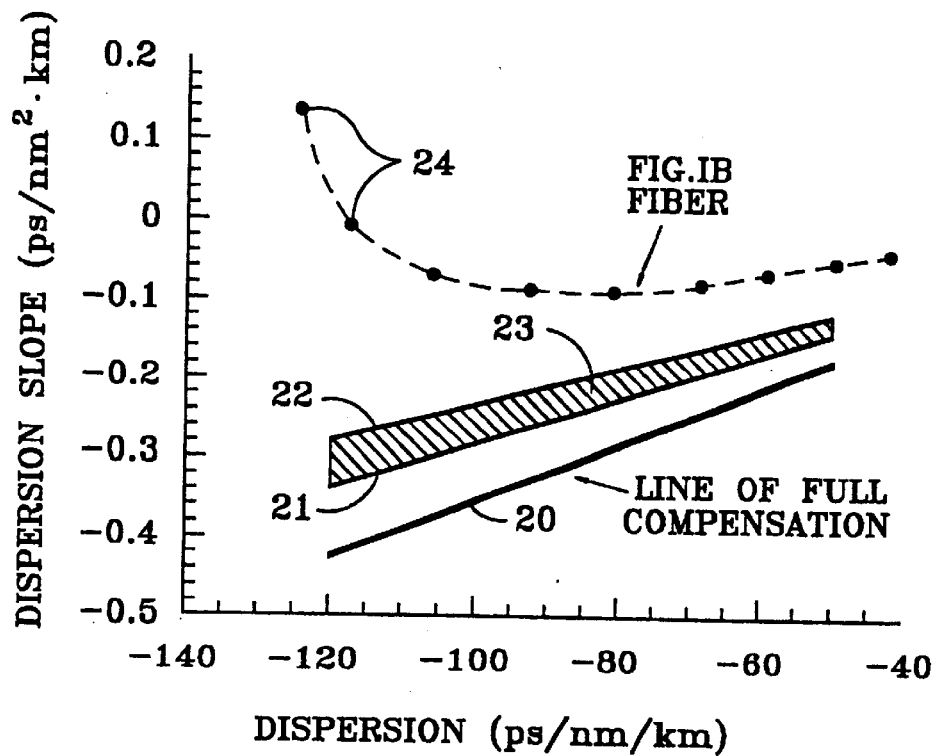
FIG. 2 is a plot showing the relationship between dispersion and dispersion slope for different values of fiber outside diameter for the fiber of FIG. 1B, and it additionally shows acceptable regions for dispersion and dispersion slope for DC fibers suitable for use in high bit rate systems.

Whereas $\Delta_C$ had to be maintained relatively large in FIG. 1B type profiles, i.e. about 1.8 to 2% to prevent the DC fiber from being bend sensitive, the value of $n_C$ in fibers of the present invention can be such that $\Delta_C \leq 1.8\%$, and in some instances, $n_C$ is preferably sufficiently low that $\Delta_C \leq 1.5\%$, and yet such fibers do not exhibit excessive bend sensitivity.

The depth of moat region 32 decreases with increasing radius. One way to obtain this type of profile is to dope the porous tubular preform that forms the moat region by flowing a fluorine-containing gas into the center of the tubular preform and outwardly through the preform pores. Moat region profiles 39 and 40 can be obtained by flowing the dopant gas, preferably $CF_4$, along the outer surface of the tubular preform as well as into the center thereof during the doping step. Although moat region 32 has a lower value of $\Delta_M$ than region 39, both profiles have a similar effect on fiber characteristics. Although moat regions 32 and 40 have the same maximum depth, moat region 40 has a greater effect on dispersion slope as the low $\Delta_M$ of moat region 40 extends throughout the entire radius thereof. To provide suitable dispersion characteristics, $-0.7\% \leq \Delta_M \leq -0.4\%$; however, for ease of fiber fabrication, when employing certain fiber fabrication processes, $\Delta_M \geq -0.65\%$.

Rings 33 and 34 of FIG. 3 can be separated by a region of zero delta (line 35), or they can be separated by regions of positive or negative delta as shown by dashed lines 36 and 37, respectively. Alternatively, the rings can be situated immediately adjacent one another, whereby spacing s is zero. The peak refractive indices of the inner and outer sections of the ring region are preferably different, and the refractive indices are preferably such that $\Delta_{R1}<\Delta_{R2}$. Lower values of $\Delta_{R1}$ tend to provide more negative values of dispersion slope; however, effective area is lowered and bend performance becomes worse.

Whereas FIG. 3 illustrates cladding at radii beyond outer ring 34, the profile could include additional regions of positive and/or negative delta between ring 34 and cladding 38 to effect an improvement in dispersion properties or other fiber characteristics.

FIG. 3 is an idealistic index profile that is intended to merely illustrate the invention; when an optical fiber based on this diagram is actually fabricated, squared edges such as the edges of moat 32 will become rounded or otherwise modified due to process conditions such as diffusion of dopants. The rounded portions of the index profile are evident in FIG. 4 which is an index profile of a core preform, the ring region of which comprises inner and outer separated rings 33' and 34', respectively, wherein $\Delta_{R1}<\Delta_{R2}$ and $\Delta_S>0$.

As an example of the improvement in dispersion characteristics afforded by the index profile in the outer portion of the ring region, DC fibers having similar index profiles were formed. The first fiber had a FIG. 1B-type profile, and the second fiber differed in that it contained a second ring 34' as shown in FIG. 4. The values of $\Delta_C$, $\Delta_M$ and $\Delta_{R1}$ for both fibers were about 1.9%, $-0.52\%$, and 0.25%, respectively. The spacing s between the centers of the rings of the FIG. 4 profile was about 1.15 $\mu$m. The value of $\Delta_{R2}$ was about 0.42%, and the value of As was about 0.16%.

The FIG. 1B-type fiber exhibited a dispersion of $-85$ ps·nm·km and a dispersion slope of $-0.17$ ps/nm$^2$·km at a measured wavelength of about 1550 nm. The FIG. 4-type fiber exhibited a dispersion of −120 ps/nm²·km and a dispersion slope of −0.2 ps/nm²·km at the same measured wavelength. The addition of the second ring 34' increased cutoff wavelength substantially and also made the fiber more stable at more negative values of dispersion. Another highly desirable attribute of this new design is greatly improved bend sensitivity. The bend-edge of the second fiber is around 1700 nm, whereas that of the fiber of FIG. 1B is at a wavelength of around 1600 nm.

The profiles of FIGS. 5A, 5B and 5C exhibit excellent dispersion characteristics. In FIG. 5A inner ring portion 44 is of relatively small delta while the delta of outer portion 45 is much larger than that of the inner portion. Decreasing the delta of the inner portion resulted in a decrease in κ, with values in the range of 300 to 425 being easily accessible. The delta of the inner portion of the ring is characterized by $\Delta_1$, the index delta at the interface 43 between the moat and the ring portion of the fiber. The value of $\Delta_1$ should be less than 0.15% and is preferably zero or near zero. The outer portion 45 of the ring region is characterized by the index delta $\Delta_R$ and the half height ring width $w_R$. Another important characteristic of the ring outer portion is the location of the ring peak radius with respect to the outer edge of the moat $(r_R-r_M)$. The value of $(r_R-r_M)$ should be between 0.3 μm and 3 μm and is preferably between 1 μm and 2.5 μm.

The process of making the FIG. 5A fiber, which utilized the dopant $SiF_4$, resulted in a moat having a delta that became less negative with increasing radius. The moat delta of that profile is characterized in Table 2B as maximum moat % delta $\Delta_{M-MAX}$, minimum moat % delta $\Delta_{M-MIN}$ and average moat % delta $\Delta_{AVG}$.

The process of making the FIG. 5B fiber, which utilized the dopant $CF_4$, resulted in an index profile such that moat 46 exhibits a delta that is relatively constant with increasing radius. The moat delta of that profile is characterized in Table 2B as average moat % delta $\Delta_{AVG}$.

Tables 2A and 2B list the physical characteristics of DC fibers F and G, which have refractive index profiles of the type shown in FIG. 5A, and of DC fiber H which has a refractive index profile of the type shown in FIG. 5B. Optical characteristics of DC fibers F, G and H are listed in Tables 3A and 3B.

TABLE 2A

| DC Fiber | Fiber Diameter (μm) | Core radius (μm) $r_C$ | Moat radius (μm) $r_M$ | Moat width (μm) $w_M$ | Ring peak radius (μm) $r_R$ | Half height ring width (μm) $w_R$ |
|---|---|---|---|---|---|---|
| F | 125 | 1.74 | 4.19 | 2.45 | 5.55 | 0.61 |
| G | 125 | 1.75 | 3.88 | 2.13 | 5.74 | 0.49 |
| H | 128 | 1.75 | 3.89 | 2.14 | 5.84 | 0.51 |

TABLE 2B

| DC Fiber | Core delta % $\Delta_C$ | Ring delta % $\Delta_R$ | Interface delta % $\Delta_I$ | Max. moat delta % $\Delta_{M-MAX}$ | Min. moat delta % $\Delta_{M-MIN}$ | Avg. moat delta % $\Delta_{M-AVG}$ |
|---|---|---|---|---|---|---|
| F | 1.96 | 0.45 | 0.04 | −0.63 | −0.44 | −0.52 |
| G | 1.93 | 0.58 | 0.00 | −0.69 | −0.42 | −0.52 |
| H | 1.88 | 0.51 | −0.08 | | | −0.50 |

TABLE 3A

| DC Fiber | PK Attn 1550 (dB/km) | PK Attn 1620 (dB/km) | Bend Pin Array 1550 (dB/km) | Bend Pin Array 1620 (dB/km) | Wavelength (nm) at BPA = 5 dB/km |
|---|---|---|---|---|---|
| F | 0.53 | 0.45 | 0.83 | 8.21 | 1610 |
| G | 0.50 | 0.43 | 0.13 | 1.80 | 1660 |
| H | 0.45 | 0.41 | 0.08 | 0.87 | 1690 |

TABLE 3B

| DC Fiber | Dispersion 1545 nm | Dispersion Slope | Percent Compensation | MFD 1550 | Cutoff Wavelength | κ value |
|---|---|---|---|---|---|---|
| F | −90.6 | −0.30 | 99% | 4.64 | 1096 | 304.32 |
| G | −89.5 | −0.24 | 80% | 4.66 | 1423 | 373.33 |
| H | −86.9 | −0.19 | 67% | 4.75 | 1507 | 450.47 |

To determine the delta values listed in Table 2B, the fiber preforms were measured on a York profile analyzer before the overcladding was deposited onto the fiber preform. As the preform composition would not cause $\Delta_1$ to be negative, it is thought that an artifact of the York profile caused $\Delta_1$ of DC fiber H to be −0.08%.

A DC fiber could be formed such that the fiber refractive index profile is as shown in FIG. 5B. In such a fiber, the refractive index of inner portion 47 of the ring region is such that $\Delta_1$ is negative. Inner portion 47 could be formed by doping the silica that forms that region with a refractive index decreasing dopant such as fluorine. If all other profile characteristics remained the same, as $\Delta_1$ is made more negative, dispersion properties improve, but fiber bend sensitivity becomes worse. FIG. 5B shows that the outer edge of the moat at radius $r_M$ occurs at that point on the index profile curve at which an abrupt change occurs in the slope of the curve.

From experience it is known that attenuation at 1550 nm for DC fibers is primarily dominated by the bend-edge. A Pin Array test can be employed to provide excess attenuation values that are a useful surrogate for the attenuation of a coil of DC fiber. Ten 0.65 mm diameter pins were arranged in a linear array with a 5 mm spacing between centers. Eight meters of DC fiber were employed for the test. The end portion of the fiber was woven in and out between adjacent pins, and the attenuation of the fiber was measured. The fiber was removed from the pin array, and its attenuation was again measured. The excess loss due to the pin array is called the Bend Pin Array loss. Table 3A shows that this loss is greater at a wavelength of about 1620 nm than at 1550 nm. This shows that some fibers that are suitable for use as dispersion compensation fibers in the C-band might not be suitable for use in the L-band. Pin array loss should be less than 12 dB/km at the longest wavelength of use, and it is preferred that the Pin Array loss be less than 5 dB/ at that wavelength. The last column of Table 3A lists the wavelength at which the Bend Pin Array loss is 5 dB/km. Lower Pin Array numbers, at a given wavelength such as 1550 nm or 1620 nm, correspond to longer cutoff wavelengths, and/or smaller mode field diameter.

Cutoff wavelengths were measured on relatively short test lengths of DC fiber; these measured cutoff wavelengths were higher than the cutoff wavelengths of the entire multi-kilometer DC fiber. The cutoff wavelength of an entire length of DC fiber might be up to about 100 nm lower than that listed in Table 3B.

Tables 3A and 3B show that as the ring-moat spacing ($r_R$-$r_M$) increases, the fiber exhibits lower bending loss.

FIG. 5C is a refractive index profile of a DC fiber, the ring region of which consists of a single symmetrical refractive index peak 48, that is, peak 48 achieves a maximum value of $\Delta_R$ at a radius that is midway between interface 50 and outer edge 49 of the ring region. The refractive index increases with increasing radius to a refractive index of at least $n_R$ at a radius that is at least 0.3 $\mu$m beyond the moat region. The value of $n_R$ is sufficiently large that $\Delta_R \geq +0.15\%$.

Dispersion compensating fibers embodying the ring region of the invention are capable of providing negative dispersion and negative dispersion slope properties suitable for use in WDM systems that operate at bit rates of 10 Gbs and higher while exhibiting low bend sensitivity. Figures of merit in excess of 300 have been achieved. Moreover, these DC fibers have exhibited good mode field diameter, i.e. greater than about 4 $\mu$m diameter. Because cutoff wavelength is relatively long, and bend-edge is at a wavelength of at least 1700 nm, this fiber design will be useful in proposed systems using fiber amplifiers that operate at wavelengths in the 1520 nm to 1620 nm region.

Although more negative values of dispersion slope can be achieved by decreasing $\Delta_M$, processing is more difficult when $\Delta_M$ values are less than about $-0.65\%$ for fibers that are clad with pure silica. It is known that updoping the cladding with a refractive index increasing dopant will effectively provide a deeper moat region. However, with profiles of the type shown in FIGS. 1A and 1B, such cladding updoping could not be done as the fiber cutoff wavelength was low to begin with, and updoping would make the cutoff wavelength even lower. However, with the addition of the second ring, the cutoff wavelength can be moved to longer wavelengths (e.g. near 1300 nm), whereby fibers of the type represented by FIGS. 3, 4, 5, 5A, 5B and 5C can be cladding-updoped to effectively achieve a deeper moat.

Figure 6:
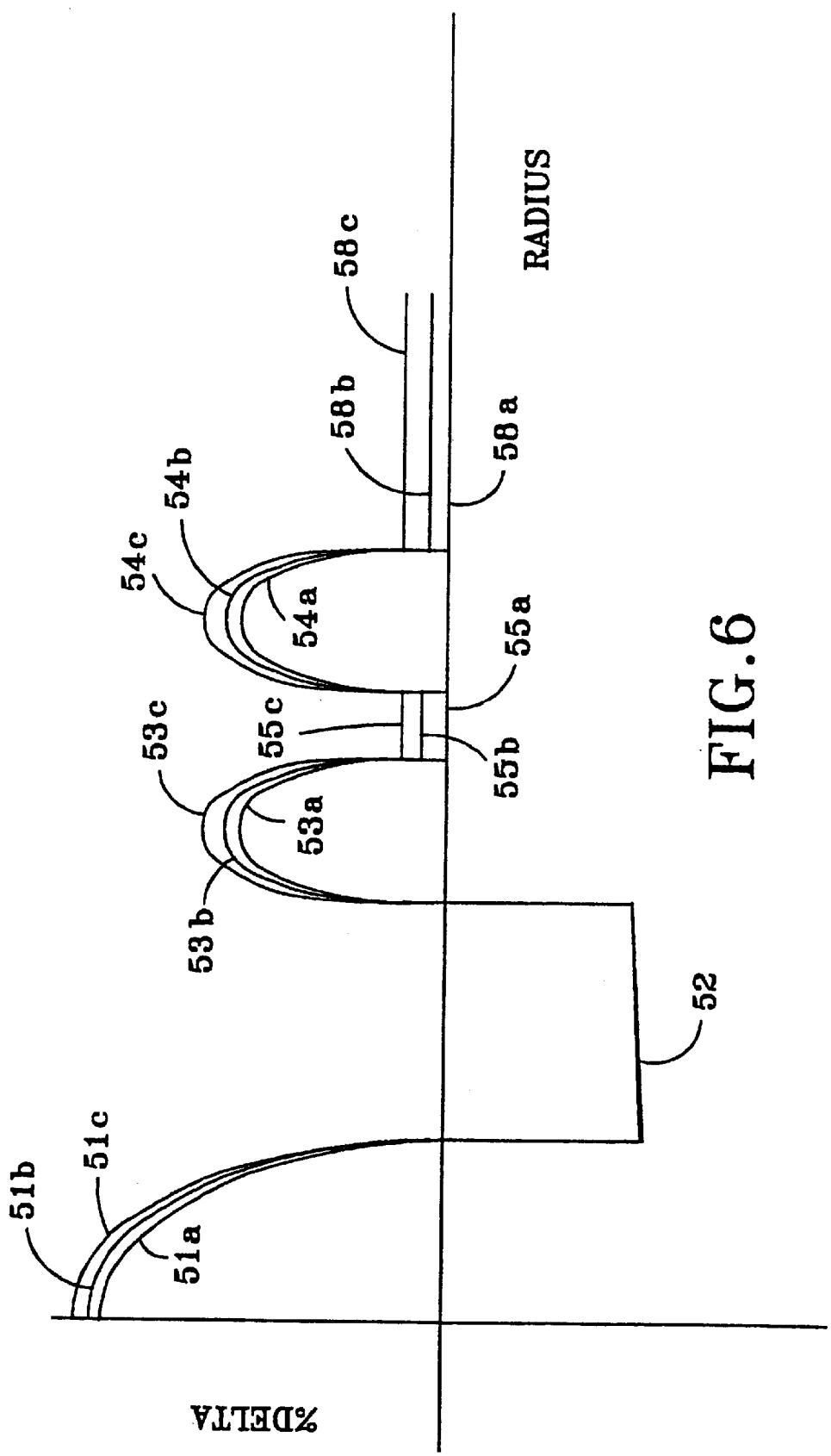
FIG. 6 shows a plurality of index profiles depicting updoping of the cladding.

Computer modeling techniques were employed to analyze the effects of updoping in order to achieve a deeper moat. A two-ring DC fiber and the updoped versions of that profile are shown in FIG. 6. The value of $\Delta_M$ for all profiles is about $-0.5\%$. Five different profiles were considered. Profile portions represented by the suffix "a" indicate no updoping; profile portions represented by the suffix "b" indicate updoping to increase delta by 0.1% delta; and profile portions represented by the suffix "c" indicate updoping to increase delta by 0.2% delta. All of the numbers listed in Table 4 represent % delta with respect to silica.

TABLE 4

| Profile | Central Core | Moat | First Ring | Inter Ring Region | Second Ring | Cladding |
|---|---|---|---|---|---|---|
| A | 2.0 | −0.5 | 0.25 | 0 | 0.42 | 0 |
| B | 2.1 | −0.5 | 0.35 | 0.1 | 0.52 | 0.1 |
| C | 2.2 | −0.5 | 0.45 | 0.2 | 0.62 | 0.2 |
| D | 2.0 | −0.5 | 0.25 | 0.1 | 0.42 | 0.1 |
| E | 2.0 | −0.5 | 0.25 | 0.2 | 0.42 | 0.2 |

Profile A represents an index profile similar to that of FIGS. 3 and 4 in that the ring region comprises two spaced rings. In profiles B and C, all portions of the fiber except the moat are updoped 0.1% delta and 0.2% delta, respectively, as compared to Profile A. If, for example, germania is employed as the refractive index increasing dopant, additional germania can be added to the cladding and all core portions except the moat. Profiles D and E are similar to profiles B and C, respectively, except that the central core portions are not updoped.

Figure 7:
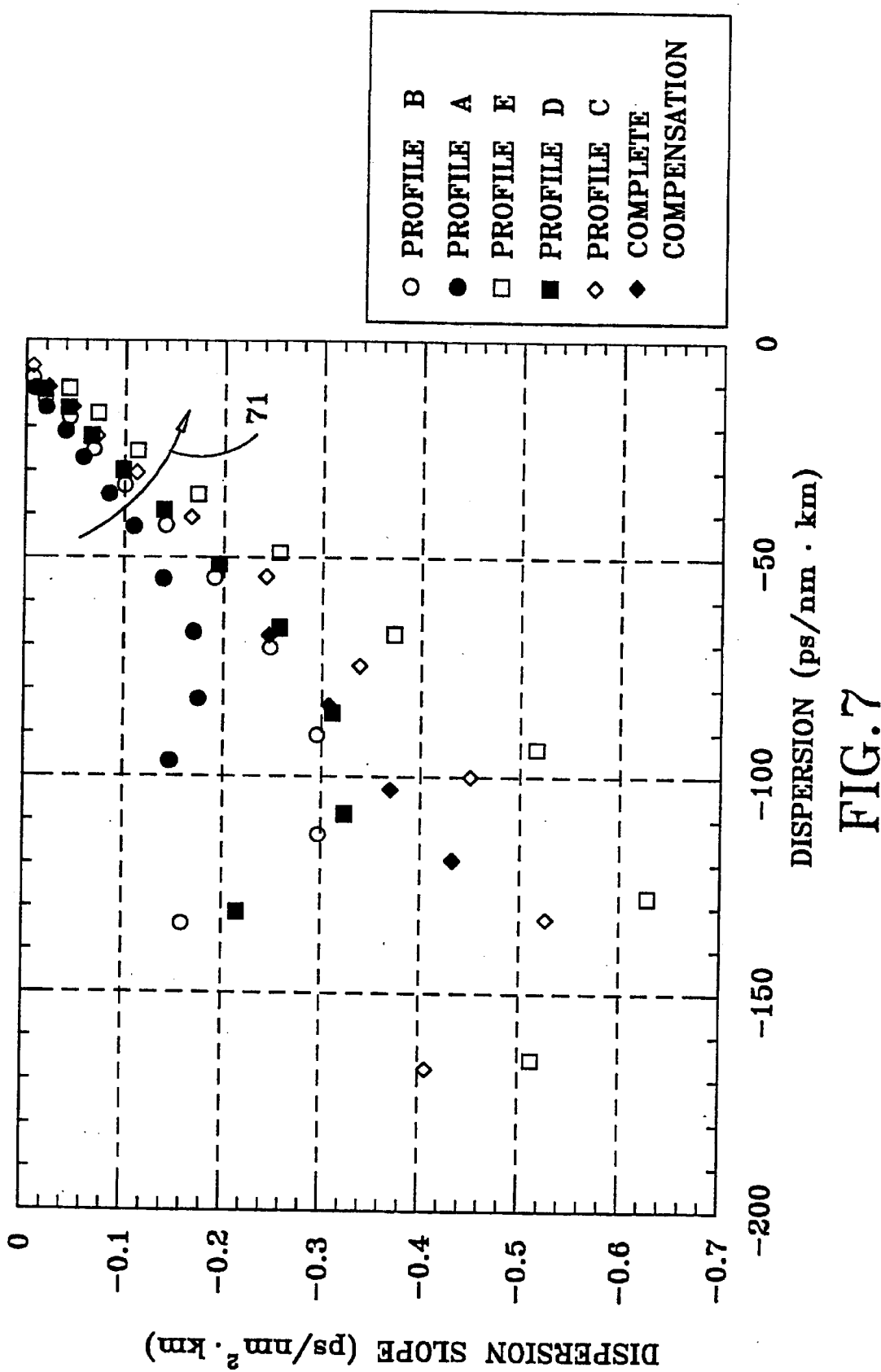
FIG. 7 is a plot showing the relationship between dispersion and dispersion slope for the fiber profiles characterized in Table 4.

The relationships between dispersion and dispersion slope for all of the profiles of Table 2 are plotted in FIG. 7. In addition, the line depicted by solid diamonds represents the line of complete compensation for SMF fibers. FIG. 7 shows that the desired negative dispersion slopes can be achieved for the prescribed negative dispersions. Arrow 71 points in the direction of better dispersion characteristics. Thus, the fiber profile represented by the open square data points exhibits better dispersion characteristics than the fiber profile represented by the dark circles. However, arrow 71 also points in the direction of increased bend sensitivity, smaller effective area and higher attenuation.

Fibers represented by Profile B exhibit Pin Array numbers that are lower for a given dispersion and dispersion slope than fibers represented by profile D, and fibers represented by Profile C exhibit Pin Array numbers that are lower for a given dispersion and dispersion slope than fibers represented by profile E.

Regardless of whether the central core region is updoped along with the cladding, it is seen that negative dispersion slopes of −0.3 to −0.4 ps/nm²·km can be achieved at a wavelength of about 1550 nm, while dispersion is about −80 to −100 ps/nm·km. For complete compensation in the erbium fiber amplifier operating window, slopes of −0.28 to −0.34 ps/nm²·km are needed for dispersions in range of −85 to −100 ps/nm·km. From the data points plotted in FIG. 7 it can be seen that, among Profiles B, C, D and E, this requirement has been achieved.

Figure 8:
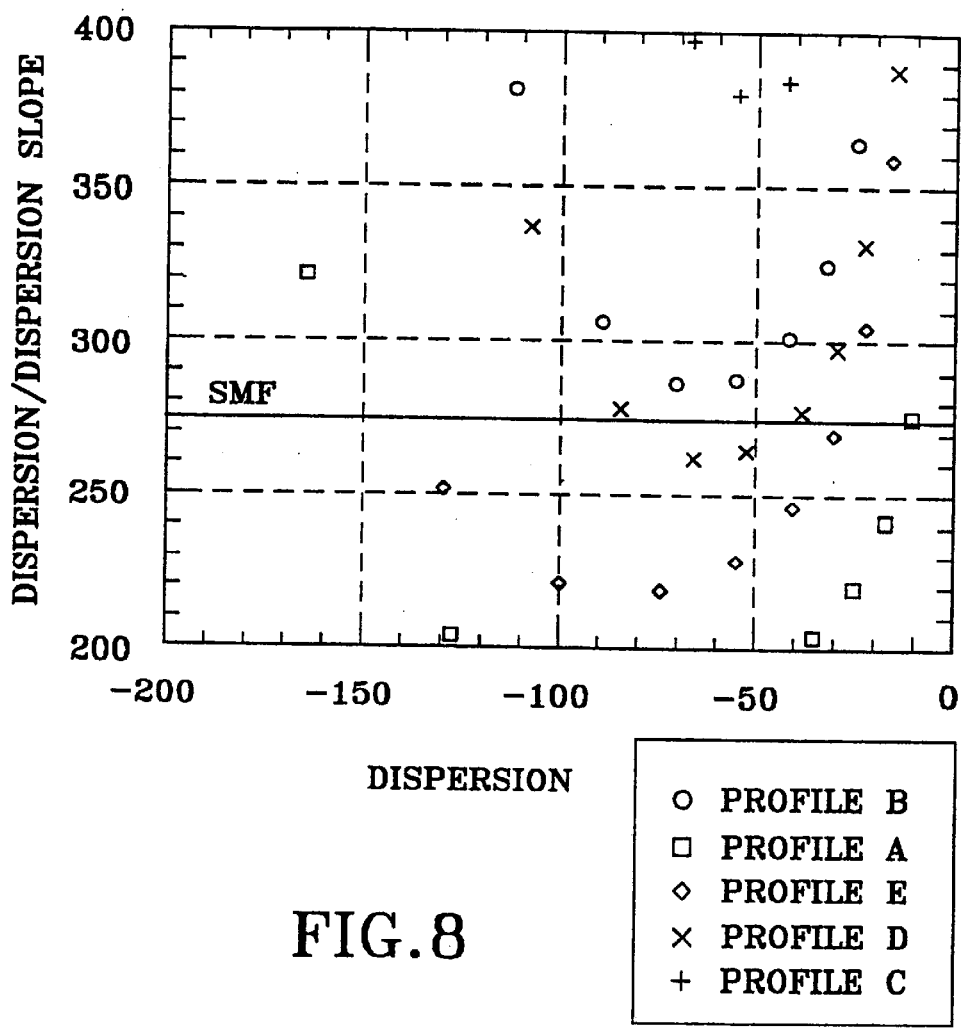
FIG. 8 is a plot showing the relationship between the ratio of dispersion to dispersion slope of the various DC fiber profiles characterized in Table 4 as a function of dispersion.

In FIG. 8 the ratio, Dispersion/DSlope, of DC fiber Profiles A through E is plotted as a function of dispersion. The solid line is the Dispersion/Dslope value of a SMF fiber. This graph shows that if fiber profile D of Table 2 were employed, complete compensation should be achieved for dispersion around −90 ps/nm.km in the 1550 nm operating window.

It is thus seen that the ring region of the invention enables the achievement of a relatively deep moat without adversely decreasing the fiber cutoff wavelength, thereby providing the much more negative dispersion slopes required by high Gbs systems.

Figure 9:
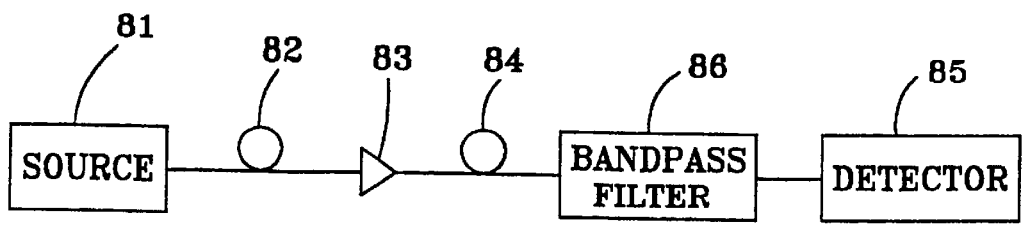
FIG. 9 schematically depicts an optical transmission system employing a dispersion compensating fiber.

DC fibers in accordance with the invention are employed in transmission systems that are represented by FIG. 9. A source 81 of signals at a wavelength greater than 1520 nm is launched into a transmission link comprising a standard SMF fiber 82 with zero dispersion at a wavelength such as about 1310 nm in the range from 1290 nm to 1330 nm. At the end of SMF fiber 82 the signal is coupled into an erbium-doped optical fiber amplifier 83. In accordance with one particular system, the amplified signal is then coupled into DC fiber 84. Compensating fiber 84 may be positioned on either side of amplifier 83 in the transmission link; moreover, it could be positioned ahead of SMF fiber 82 to pre-distort the signal, which can then be amplified and transmitted. In some systems DC fiber 84 can be used without an amplifier, depending on the length of the transmission link. Bandpass filter 86 is used to filter unwanted amplified spontaneous emission from fiber amplifier 83 before the signal is sent to detector 85. Other equipment, such as WDM components, is not illustrated.

It was mentioned in connection with FIGS. 5A and 5B that DC fibers having values of $\Delta_1$ near zero exhibit very good dispersion and attenuation characteristics. When making such a fiber, that region of a porous preform that forms an interface with the moat region is formed of pure $SiO_2$, and the adjacent ring region is formed of $SiO_2$ doped with a refractive index increasing dopant such as $GeO_2$. During the process of consolidating the porous preform, some of the $GeO_2$ can diffuse into the adjacent silica region, whereby $\Delta_1$ is sufficiently greater than zero that κ increases and bending loss increases. The following process, which results in the formation of a FIG. 5B type fiber, minimizes the $GeO_2$ diffusion.

A central core rod of germania doped silica is formed by any suitable technique. The germania concentration decreases with radius whereby the refractive index decreases radially in accordance with the equation $n(r)=n_c[1-(r/a)^\Delta]$, where $\Delta$ is about 2, $n_c$ is the peak refractive index of the rod and a is the outer radius of the rod.

Figure 10:
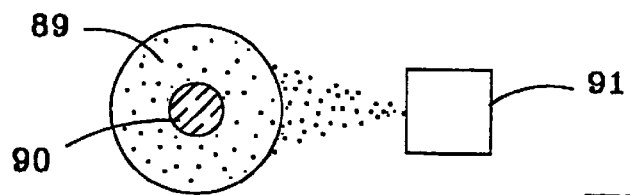
FIG. 10 schematically shows the deposition of glass particles to form a porous glass preform used in the manufacture of a dispersion compensating fiber in accordance with the present invention.

A fluorine doped silica tube is formed in a conventional manner by depositing silica particles on a large diameter mandrel and then removing the mandrel to form a tubular porous preform that is suspended in a consolidation furnace. Standard equipment of the type shown in FIG. 10 is employed during the process of forming the porous preform and during the drying/consolidation process. The preform is initially heated to about 1000° C. for a sufficient length of time to dry it while helium flows through the furnace muffle and helium and chlorine flow into the center of the preform. The preform is then subjected to gradient consolidation by lowering it at a sufficient rate through a furnace hot zone at about 1500 ° C. while helium and $CF_4$ flows through the furnace muffle and helium, chlorine and $CF_4$ flows into the center of the preform. During a second pass, the resultant preform is reheated to a temperature greater than 1000° C. and less than the sintering temperature to reduce seeds during subsequent processing of the flourine doped tube. This can be done by drawing the preform at a suitable rate through a furnace hot zone preferably at about 1400° C. as helium flows through the furnace muffle and chlorine flows into the center of the tube. This process forms a solid, fluorine-doped silica tube.

The core rod mentioned above is placed into the solid fluorine doped tube, and a chlorine purge is effected by heating the tube and flowing chlorine through the region between the rod and tube. The region between the rod and tube is thereafter evacuated, and the end of the composite of rod and tube is heated and redrawn to collapse the tube onto the rod and form an 8 mm diameter intermediate preform rod in which the tube is in intimate contact with the core rod.

A porous ring preform 89 is then formed by sequentially depositing from a burner 91 layers of undoped and doped silica particles onto mandrel 90 as shown in FIG. 10. A handle (see FIG. 11) surrounds one end of mandrel 90. The mandrel is translated back and forth along its axis with respect to the burner and is rotated about its axis during the deposition process. Burner 91 was a conventional burner having a central fume hole surrounded by concentric rings of openings that supplied the flame gases, the inner shield oxygen IS and the outer shield oxygen OS. The flow rates of gases and reactants to the various burner openings are listed in Table 5 where all flow rates are expressed in units of slpm. Table 5 gives flow rates for only those burner passes that are required to make the inner dense and transition portion of the porous preform. The remainder of the burner passes were carried out in a conventional manner.

TABLE 5

| Pass No. | Flame | | | | | |
|---|---|---|---|---|---|---|
| | IS | OS | $O_2$ | $CH_4$ | $SiCl_4$ | Fume $O_2$ |
| 1 | 0.75 | 1.5 | 3.5 | 5.0 | 0 | 0.5 |
| 2 | 3.0 | 6.0 | 4.2 | 5.0 | 1.3 | 2.0 |
| 11 | 3.41 | 5.81 | 5.11 | 6.078 | 1.32 | 2.368 |
| 12 | 3.41 | 5.81 | 5.11 | 6.078 | 1.32 | 2.368 |
| 36 | 3.535 | 5.753 | 5.293 | 6.298 | 2.5 | 2.478 |

No deposition occurred during the first pass of the burner with respect to the mandrel. During passes 2–11 a layer of glass particles was deposited on the mandrel under conditions that formed a high density layer of porous silica; the flow rates varied linearly from those at pass 2 to those at pass 11. During burner passes 12–36 a transition layer of silica was formed in which the density varied from high density to normal density, the flow rates varying linearly from those at pass 12 to those at pass 36.

The remainder of the preform was deposited in a conventional manner. During passes 37 to 156, normal density silica was deposited. $GeO_2$-doped $SiO_2$ was deposited in a conventional manner during passes 157 to 201. Passes 202 to 1201 deposited an outer layer of pure silica on the porous preform.

Figure 11:
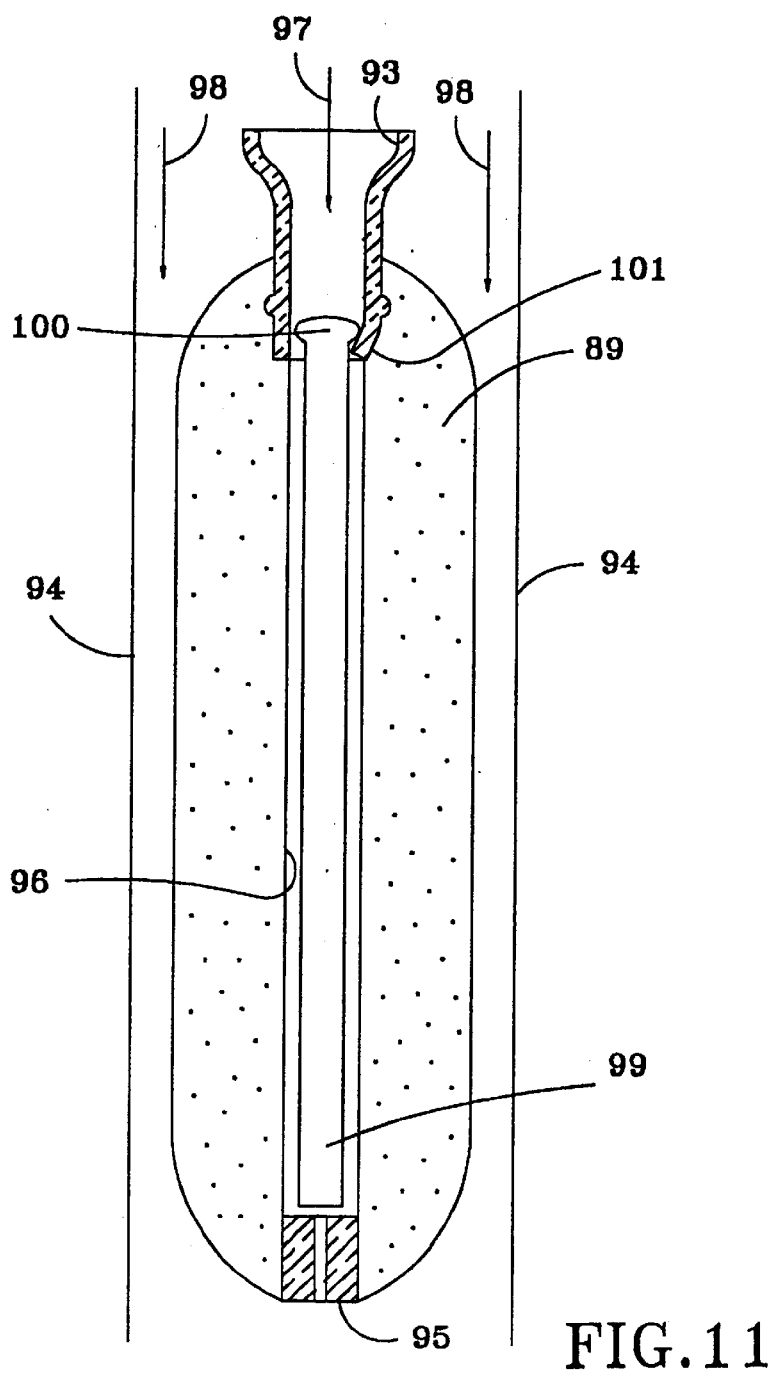
FIG. 11 is a cross-sectional view illustrating the consolidation of a porous preform onto a glass rod to form a preform used in the manufacture of a dispersion compensating fiber.

Mandrel 90 was removed from the porous preform 89 and the handle 93 to form the hollow porous preform 89 of FIG. 11. A short length of silica capillary tube 95 was inserted into that end of preform aperture 96 opposite handle 93.

The small diameter end of handle 93 was provided with a plurality of. indentations 101. An enlarged end 100 was formed on one end of an intermediate preform rod 99. Rod 99 was inserted through handle 93 and into preform aperture 96 until enlarged end 100 contacted indentations 101. The composite preform was suspended by handle 93 in a consolidation furnace, muffle 94 of which is schematically shown. The furnace was heated to about 1000° C. for 60 minutes while 640 sccm helium and 66 sccm chlorine flowed through handle 93 and into aperture 96 (arrow 97) to dry the preform. The preform was then subjected to gradient consolidation by lowering it at 5 mm/minute through the 1500° C. furnace hot zone while 20 slpm helium flowed through the furnace muffle (arrows 98) and 320 sccm helium and 90 sccm chlorine flowed through handle 93 into aperture 96. When a backpressure gauge indicated that tube 95 had closed, gas flow 97 was terminated. During a resinter phase the resultant preform was then driven at 5 mm/minute through a 1400° C. hot zone while 20 sccm helium flowed through the muffle. During the consolidation process porous preform 89 collapsed onto rod 99 to form a solid glass rod the refractive index profile of which is shown in FIG. 5B. That glass rod was inserted into a draw furnace and drawn to reduce its diameter and form a final preform rod.

The final preform rod was then further overclad with silica particles which were consoldated to form a blank that was drawn into DC fiber. The amount of overclad that is applied determines the core diameter of the drawn fiber, which in turn determines dispersion and other characteristics of the fiber. As shown in Tables 3A and 3B, dispersion characteristics and optical characteristics such as cutoff wavelength are also determined by the radial separation between the ring peak and the outer edge of the moat. This radial distance is determined by the number of passes employed to deposit $SiO_2$ after the transition layer has been deposited. In the particulate deposition portion of the above example, the first 36 burner passes of which are listed in Table 5, this distance is determined by the 120 passes that were made from passes 37 through 156.

The characteristics of the resultant fiber are set forth in Tables 2A, 2B, 3A and 3B as DC fiber H. A value of $\Delta_1$ near zero was achieved because of two features of the process of making the fiber.

The first process feature concerns the deposition of the preform that forms the ring region and the inner region of the fiber cladding. It is desired that this region of the DC fiber contain little or no refractive index increasing dopant such as $GeO_2$. To prevent diffusion of $GeO_2$ into the $SiO_2$ inner ring region, especially to the ring/moat interface, the first deposited portion of the porous preform that forms the ring region is deposited at a density that is significantly higher than normal deposition density. To accomplish this, the flow of the reactant, eg. $SiC_4$, that forms the $SiO_2$, is decreased in flow rate to less than 70% of the normal reactant flow rate that is used to form the $SiO_2$ region at radii greater than the transition region. Also, the flame temperature is high during the deposition of the high density layer. The density of the low density region at radii greater than the transition region is at least 30% less than the density of the first deposited portion of the preform. Whereas silica and germania were employed to make the preform of the above example, the improved method of the invention applies to any suitable base glass and refractive index modifying dopant.

The second process feature concerns the consolidation of the the preform that forms the ring region and the inner region of the fiber cladding. To further prevent diffusion of $GeO_2$ into the $SiO_2$ inner ring region to the ring/moat interface, at least 75 sccm chlorine flows into the preform aperture during the sinter phase. Because of the high concentration of chlorine in the preform aperture and adjacent portion of the porous preform, $GeO_2$ is much less likely to deposit in this region of the preform.

Without these two process features, $GeO_2$ would have diffused from the outer ring region 45' into the inner ring region 47 (FIG. 5B) to impart to that inner ring region a sufficiently positive value of $\Delta_1$ that $\kappa$ would have been increased and cutoff wavelength would be lower than desired, thus reducing the bend edge wavelength. Either one of these process features alone should result in some reduction in $GeO_2$ diffusion.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

We claim:

1. A dispersion compensating optical fiber comprising
a core of transparent material surrounded by a cladding layer of transparent material having a refractive index $n_{CL}$, said core including three radially adjacent regions, named in order of increasing radius,
   (a) a central core region having a maximum refractive index $n_C$ such that $\Delta_C$ is greater than +1.2%,
   (b) a moat region having a negative refractive index $\Delta_M$, and
   (c) a ring region that includes a segment where refractive index increases with increasing radius to a peak ring refractive index of at least $n_R$ such that $\Delta_R > +0.15\%$, said segment being located at a peak ring radius that is at least 0.3 µm beyond said moat region, the refractive index profile of said fiber being such that the dispersion slope of said fiber is more negative than $-0.15$ ps/nm$^2$·km at a wavelength of about 1550 nm, where $\Delta_C$ equals $(n_C^2 - n_{CL}^2)/2n_C^2$, $\Delta_M$ equals $(n_M^2 - n_{CL}^2)/2n_M^2$ and $\Delta_R$ equals $(n_R^2 - n_{CL}^2)/2n_R^2$.

2. The optical fiber of claim 1 wherein said ring region includes inner and outer portions having maximum refractive indices $n_{R1}$ and $n_{R2}$, respectively, that are greater than $n_{CL}$, and wherein $\Delta_{R1} < \Delta_{R2}$, where $\Delta_C$ equals $(n_C^2 - n_{CL}^2)/2n_C^2$, $\Delta_{R1}$ equals $(n_{R1}^2 - n_{CL}^2)/2n_{R1}^2$, and $\Delta_{R2}$ equals $(n_{R2}^2 - n_{CL}^2)/2n_{R2}^2$.

3. The optical fiber of claim 2 wherein the outerportion of said ring region includes a peak having a maximum refractive index $n_2$ such that $\Delta_{R2} > +0.15\%$.

4. The optical fiber of claim 3 wherein the maximum refractive index of said peak is located between 1 µm and 2.5 µm from the outer edge of moat region.

5. The optical fiber of claim 1 wherein said moat region has a minimum refractive index $n_M$ such that $\Delta_M < -0.4\%$.

6. The optical fiber of claim 1 wherein the index of said ring region increases monotonically from the outer edge of said moat region to the peak refractive index of said ring region.

7. The optical fiber of claim 6 wherein said peak ring radius is located less than 3 µm beyond said moat region.

8. The optical fiber of claim 1 wherein said peak ring radius is located less than 3 µm beyond said moat region.

9. The optical fiber of claim 1 wherein the maximum refractive index of said ring region occurs at a radius other than the center radius of said ring region.

10. The optical fiber of claim 1 wherein the maximum refractive index of said ring region occurs at the center radius of said ring region.

11. The optical fiber of claim 1 wherein the radial refractive index plot of said fiber is characterized in that the area under the outer half of said ring region is greater than the area under the inner half of said ring region.

12. The optical fiber of claim 1 wherein said cladding layer consists of silica, and said moat region is formed of silica doped with a refractive index decreasing dopant.

13. The optical fiber of claim 12 wherein said refractive index decreasing dopant comprises fluorine.

14. The optical fiber of claim 1 wherein said cladding layer consists of silica doped with a refractive index increasing dopant, and said moat region is formed of silica doped with a refractive index decreasing dopant.

15. The optical fiber of claim 14 wherein said refractive index decreasing dopant comprises fluorine.

16. The optical fiber of claim 1 wherein $\Delta_M \geq -0.7\%$.

17. The optical fiber of claim 1 wherein $\Delta_C \leq 2\%$.

18. The optical fiber of claim 1 wherein $\Delta_C \leq 1.8\%$.

19. The optical fiber of claim 1 wherein $\Delta_C \leq 1.5\%$.

20. The optical fiber of claim 1 wherein the refractive index profile of said fiber is such that the dispersion slope is more negative than $-0.2$ ps/nm$^2$·km at a wavelength of about 1550 nm.

21. The optical fiber of claim 20 wherein the refractive index profile of said fiber is such that dispersion is more negative than $-80$ ps/nm·km at a wavelength of about 1550 nm.

22. The optical fiber of claim 1 wherein said segment is at least 4.75 µm from the center of said fiber.

23. A dispersion compensating optical fiber comprising
a core of transparent material surrounded by a cladding layer of transparent material having a refractive index $n_{CL}$, said core including three radially adjacent regions, named in order of increasing radius,
   (a) a central core region having a maximum refractive index $n_C$ such that $\Delta_C$ is greater than +1.2%, (b) a moat region having a negative refractive index $n_M$ such that $\Delta_M < -0.4\%$, and (c) a ring region that includes a segment where refractive index increases with increasing radius to a peak ring refractive index of at least $n_R$ such that $\Delta_R > +0.15\%$, said segment being located at a peak ring radius that is at least 0.3 µm beyond said moat region, the refractive index profile of said fiber being such that the dispersion slope of said fiber is more negative than $-0.15$ ps/nm²·km at a wavelength of about 1550 nm, where $\Delta_C$ equals $(n_C^2 - n_{CL}^2)/2n_C^2$, $\Delta_M$ equals $(n_M^2 - n_{CL}^2)/2n_M^2$ and $\Delta_R$ equals $(n_R^2 - n_{CL}^2)/2n_R^2$, and (d) wherein said ring region includes inner and outer portions having maximum refractive indices $n_{R1}$ and $n_{R2}$, respectively, that are greater than $n_{CL}$.

24. A dispersion compensating optical fiber comprising a core of transparent material surrounded by a cladding layer of transparent material having a refractive index $n_{CL}$, said core including three radially adjacent regions, named in order of increasing radius, (a) a central core region having a maximum refractive index $n_C$ such that $\Delta_C$ is greater than +1.2%, (b) a moat region having a negative refractive index $n_M$ such that $\Delta_M \leq -0.4\%$, and (c) a ring region that includes a segment where refractive index increases with increasing radius to a peak ring refractive index of at least $n_R$ such that $\Delta_R > +0.15\%$, said segment being located at a peak ring radius that is at least 0.3 µm beyond said moat region, the refractive index profile of said fiber being such that the dispersion slope of said fiber is more negative than $-0.15$ ps/nm²·km at a wavelength of about 1550 nm, where $\Delta_C$ equals $(n_C^2 - n_{CL}^2)/2n_C^2$, $\Delta_M$ equals $(n_M^2 - n_{CL}^2)/2n_M^2$ and $\Delta_R$ equals $(n_R^2 - n_{CL}^2)/2n_R^2$, and (d) wherein the outer portion of said ring region includes a peak having a maximum refractive index $n_2$ such that $\Delta_{R2}$, +0.15% and the maximum refractive index of said peak is located between 0.3 µm and 3 µm from the outer edge of moat region.

\* \* \* \* \*

UNITED STATES PATENT AND TRADEMARK OFFICE
CERTIFICATE OF CORRECTION

PATENT NO. : 6,597,848 B1
DATED : July 22, 2003
INVENTOR(S) : Berkey, George E. et al.

It is certified that error appears in the above-identified patent and that said Letters Patent is hereby corrected as shown below:

Column 17,
Line 63, "ring refractive index of at least $n_R$ such that $\Delta_R$>+" should be
-- ring refractive index of at least $n_R$ such that $\Delta_R \geq +$ --

Column 18,
Line 3, "$\Delta_N$ equals $(n_M - n_{CL}^2)/2n_M^2$ and $\Delta_R$ equals $(n_R^2$-" should be
-- $\Delta_N$ equals $(n_M^2 - n_{CL}^2)/2n_M^2$ and $\Delta_R$ equals $(n_R^2$- --
Line 11, "3. The optical fiber of claim 2 wherein the outerportion of" should be
-- 3. The optical fiber of claim 2 wherein the outer portion of --
Line 13, "tive index $n_2$ such that $\Delta_{R2}$>+0.15%." should be -- tive index $n_2$ such that $\Delta_{R2} \geq +0.15\%$. --
Line 18, "has a minimum refractive index $n_M$ such that $\Delta_M$<-0.4%." should be
-- has a minimum refractive index $n_M$ such that $\Delta_M \leq -0.4\%$. --

Column 19,
Line 2, "such that $\Delta_M$<-0.4%, and" should be -- such that $\Delta M \leq -0.4\%$, and --
Line 5, "ring refractive index of at least $n_R$ such that $\Delta_R$>+" should be
-- ring refractive index of at least $n_R$ such that $\Delta_R \geq +$ --

Column 20,
Line 7, "ring refractive index of at least $n_R$ such that $\Delta_R$>+" should be
-- ring refractive index of at least $n_R$ such that $\Delta_R \geq +$ --
Line 18, "$n_2$ such that $\Delta_{R2}$, +0.15% and the maximum refract-" should be
-- $n_2$ such that $\Delta_{R2} \geq +0.15\%$ and the maximun refract- --

Signed and Sealed this

Twenty-fifth Day of November, 2003

JAMES E. ROGAN
*Director of the United States Patent and Trademark Office*